W. MINIER.
HARROW ATTACHMENT FOR GANG PLOWS.
APPLICATION FILED SEPT. 13, 1915.
1,165,527.
Patented Dec. 28, 1915.
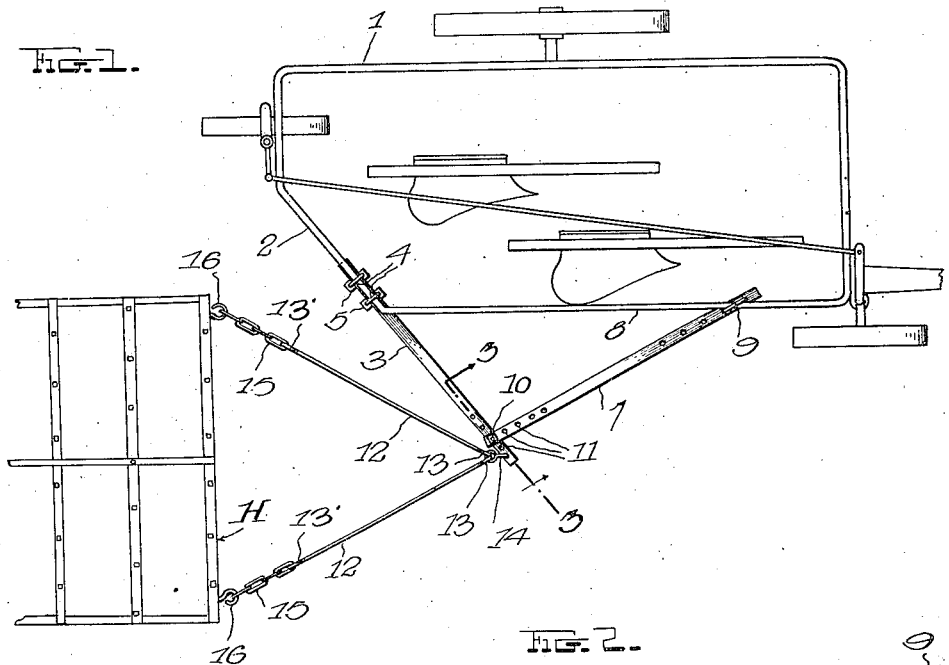
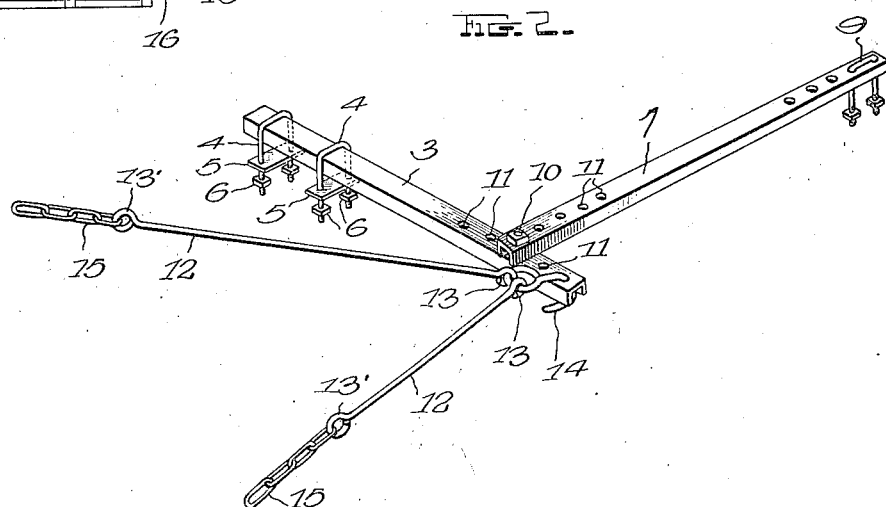
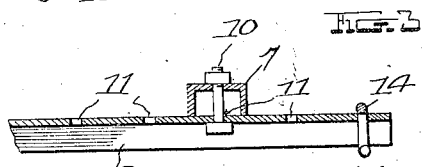
Witnesses
H. Woodald
Inventor
William Minier
By H. B. Willson & Co.
Attorneys

UNITED STATES PATENT OFFICE.

WILLIAM MINIER, OF PRINCETON, ILLINOIS.

HARROW ATTACHMENT FOR GANG-PLOWS.

1,165,527.

Specification of Letters Patent.

Patented Dec. 28, 1915.

Application filed September 13, 1915. Serial No. 50,433.

*To all whom it may concern:*

Be it known that I, WILLIAM MINIER, a citizen of the United States, residing at Princeton, in the county of Bureau and State of Illinois, have invented certain new and useful Improvements in Harrow Attachments for Gang-Plows; and I do declare the following to be a full, clear, and exact description of the invention, such as will enable others skilled in the art to which it appertains to make and use the same.

My invention relates to attaching means by which a harrow may be connected to the ordinary gang plow, and has for its object to provide a very simply constructed device which can be very cheaply manufactured.

A further object is to provide adjustable means for attaching a harrow to gang plows of various sizes.

With the above and other objects in view my invention resides in certain novel features of construction, combination and arrangement of parts which will hereinafter be more particularly described and claimed and shown in the drawings wherein:

Figure 1 represents a top plan view of a gang plow showing a harrow connected thereto by means of my improved attachment; Fig. 2 represents a detail perspective view of the device detached. Fig. 3 is a detail vertical section on line 3—3 of Fig. 1.

In the embodiment illustrated my invention is shown as applied to an ordinary form of gang plow 1, the frame of which is substantially rectangular in shape with one side inclined inwardly and rearwardly as shown at 2, as is customary.

My invention comprises substantially a right angular bracket connected to one side of the frame of the gang plow 1, one arm 3 of said bracket being removably and adjustably secured to the inclined portion 2 by means of a pair of U-shaped clamps 4, the ends of which are adapted to receive the clamping plates 5 which are held in operative position by the nuts 6 threaded on the ends of said clamps 4. The other arm 7 of the bracket has one end adjustably and removably secured to the side 8 of the plow frame by means of a clamp 9 similar in construction to the aforementioned clamps 4, while its opposite end is adjustably connected to the free end of the first mentioned arm 3 by means of a bolt 10 which is adapted to pass through alined openings 11 in the ends of said arms. A series of these openings 11 are formed in the outer ends of each of the arms 3 and 7 to provide a wide range of adjustment. The inner end of the arm 7 is also provided with a series of openings adapted to receive the arms of the clamp 9 in order that said arm 7 may be adjustably connected to the side of the plow frame.

A pair of rods 12 are provided on their opposite ends with eyes 13 and 13′, the eyes 13 receiving the attaching end of a hook 14, the active end of which is adapted to be inserted through any one of the series of openings 11 in the arm 3, adjacent the apex of said bracket. This arrangement places the forward ends in close relation while the rear ends of said rods 12 diverge as clearly shown in Fig. 1. The outer or rear ends of these diverging arms receive a number of links 15 which are adapted to receive hooks 16 on the draw bar of a harrow H.

From the foregoing description it is evident that the bracket formed by the arms 3 and 7 can be readily secured to any gang plow of the usual construction, the apex of this bracket receiving means by which a harrow can be connected thereto. This arrangement positions the harrow of the gang plow in position to do the best work, and it is disposed the proper distance behind the plow to allow it to readily make the turns at the corners of the field.

While I have described the elements best adapted to perform the functions allotted to them, it is obvious that various changes in form, proportion and in the minor details of construction may be resorted to within the scope of the appended claims without departing from or sacrificing any of the principles of this invention.

Having thus described my invention, what I claim is:—

1. The combination, a plow frame of substantially rectangular formation having one side inclined rearwardly and inwardly; of a substantially right angular bracket having one of its arms secured to said inclined portion, and the other arm secured to said side, a pair of rods extending rearwardly from the apex of said bracket, means for adjustably attaching the ends of said rods to the bracket, and means on the rear ends of said rods for removably attaching a harrow thereto.

2. The combination, a plow frame of substantially rectangular formation having one side inclined rearwardly and inwardly: of a substantially right angular bracket having one of its arms adjustably secured to said inclined portion and its other arm adjustably connected to said side and to the free end of the first mentioned arm, a pair of rearwardly diverging rods adjustably attached to the first mentioned arm adjacent the apex of the bracket, and links on the rear end of said rods for removably attaching a harrow thereto.

In testimony whereof I have hereunto set my hand in presence of two subscribing witnesses.

WILLIAM MINIER.

Witnesses:
 EDWIN M. YOUNG,
 N. H. WEEKS.